(12) United States Patent
Wang et al.

(10) Patent No.: US 8,289,294 B2
(45) Date of Patent: Oct. 16, 2012

(54) TOUCH-SENSITIVE DISPLAY PANEL

(75) Inventors: Po-Hsien Wang, Taichung (TW);
Chih-Chang Lai, Taiping (TW);
Jyun-Sian Li, Tainan (TW); Ching-Fu Hsu, Fongyuan (TW)

(73) Assignee: Wintek Corporation, Taichung (TW)

( * ) Notice: Subject to any disclaimer, the term of this patent is extended or adjusted under 35 U.S.C. 154(b) by 211 days.

(21) Appl. No.: 12/944,894

(22) Filed: Nov. 12, 2010

(65) Prior Publication Data

US 2011/0109579 A1  May 12, 2011

(30) Foreign Application Priority Data

Nov. 12, 2009  (TW) ................................ 98138502 A (51) Int. Cl.
*G06F 3/041* (2006.01)
(52) U.S. Cl. ........................................................ 345/173
(58) Field of Classification Search ........... 345/173–176
See application file for complete search history.

(56) References Cited

U.S. PATENT DOCUMENTS

| | | | |
|---|---|---|---|
| 2006/0007165 A1* | 1/2006 | Yang et al. | 345/173 |
| 2008/0062139 A1* | 3/2008 | Hotelling et al. | 345/173 |
| 2009/0096759 A1* | 4/2009 | Nishiwaki et al. | 345/173 |

* cited by examiner

*Primary Examiner* — Alexander Eisen
*Assistant Examiner* — Amit Chatly
(74) *Attorney, Agent, or Firm* — Thomas|Kayden (57) ABSTRACT

A touch-sensitive display panel including a first substrate, a second substrate, an active pixel matrix, many driving circuits, many sensing electrodes and many color filter layers is provided. The active pixel matrix includes many pixels. The second substrate has a first surface and a second surface, wherein the first surface faces the active pixel matrix. The driving circuits are corresponding to the edges of the pixels for forming many openings. Each driving circuit includes a first main line and a second main line. The first main line has a first end connected to the active pixel matrix and a second end connected to the first substrate. The second main line is connected to the second end of the first main line through the first substrate. The color filter layers are filled in the openings. The sensing electrodes and the driving circuits are used for detecting at least one touch point.

20 Claims, 6 Drawing Sheets

TOUCH-SENSITIVE DISPLAY PANEL

This application claims the benefit of Taiwan application Serial No. 98138502, filed Nov. 12, 2009, the subject matter of which is incorporated herein by reference.

BACKGROUND OF THE INVENTION

1. Field of the Invention

The invention relates in general to a display panel, and more particularly to a touch-sensitive display panel.

2. Description of the Related Art

Nowadays, the touch panel has been widely used in many electronic products such as mobile phone, PDA, GPS device and so on. By integrating the touch panel with the display panel, the user can perform touch control through the display screen. However, most of the electronic products with touch control function directly assemble the touch panel and the display panel together, making the electronic products heavy and thick and further jeopardizing the aesthetics of the products. Therefore, how to provide the user with better products has become a prominent task for the industries.

SUMMARY OF THE INVENTION

The invention is directed to a touch-sensitive display panel, in which the driving circuit and the sensing electrode for touch detection are respectively disposed on two surfaces of the same substrate of a display panel, not only simplifying the structure of the panel, but also preventing the panel from the interference occurring between different signals.

According to a first aspect of the present invention, a touch-sensitive display panel including a first substrate, a second substrate, an active pixel matrix, a plurality of driving circuits, a plurality of sensing electrodes and a plurality of color filter layers is provided. The active pixel matrix disposed on the first substrate includes a plurality of pixels. The second substrate parallel to the first substrate has a first surface and a second surface, wherein the first surface faces the active pixel matrix. The driving circuits are disposed on the first surface and corresponding to the edges of the pixels for forming a plurality of openings. Each of the driving circuits includes a first main line and a second main line. The first main line has a first end connected to the active pixel matrix and a second end connected to the first substrate. The second main line is connected to the second end of the first main line through the first substrate, wherein the extension direction of the second main line is consistent to that of a part of the first main line. The color filter layers are disposed on the first surface and filled in the openings. The sensing electrodes, disposed on the second surface, and the driving circuits are used for detecting at least one touch point.

The invention will become apparent from the following detailed description of the preferred but non-limiting embodiments. The following description is made with reference to the accompanying drawings.

DETAILED DESCRIPTION OF THE INVENTION

Figure 1A:
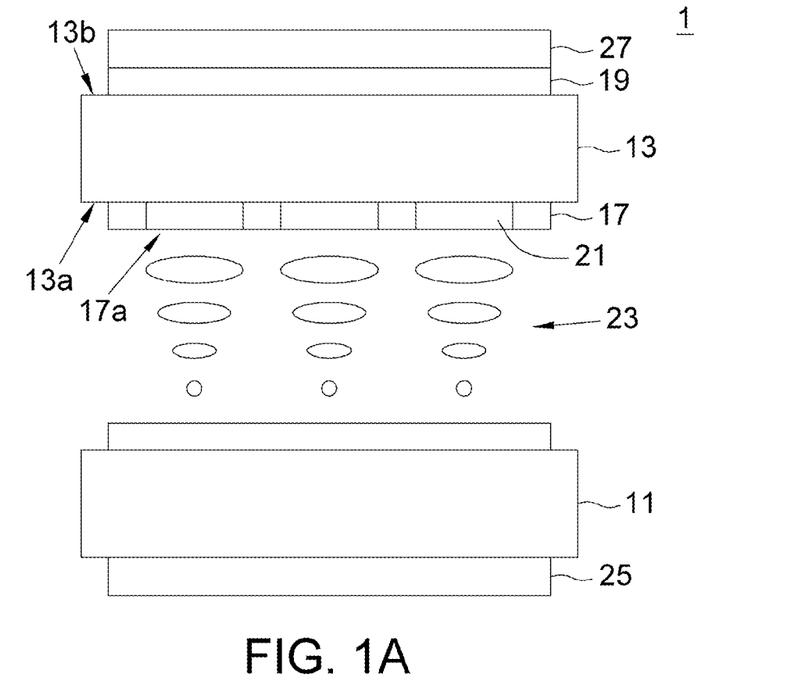
FIG. 1A shows a touch-sensitive display panel according to a preferred embodiment of the invention.
Figure 1B:
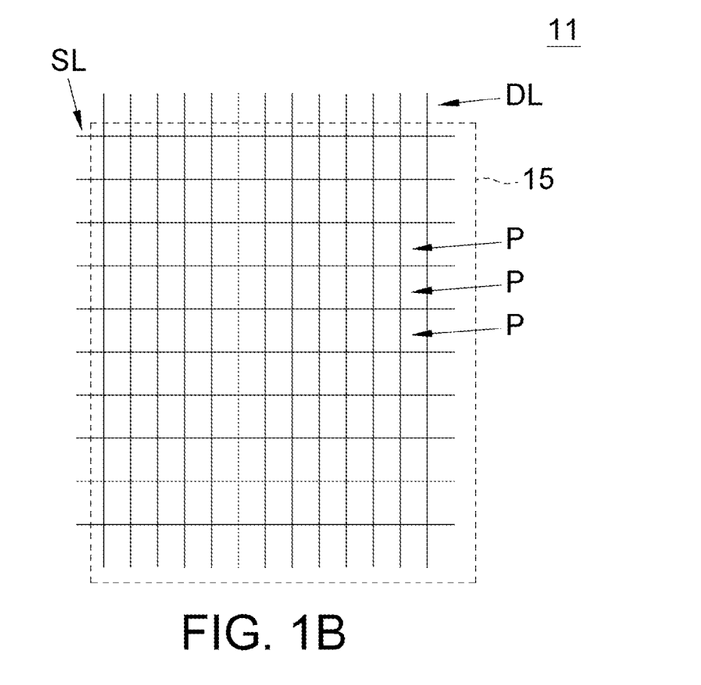
FIG. 1B shows the disposition of the signal lines of the touch-sensitive display panel of FIG. 1A.

Referring to FIG. 1A, 1B. FIG. 1A shows a touch-sensitive display panel according to a preferred embodiment of the invention. FIG. 1B shows the disposition of the signal lines of the touch-sensitive display panel of FIG. 1A. The touch-sensitive display panel 1 includes a first substrate 11, a second substrate 13, an active pixel matrix 15 (illustrated in FIG. 1B), a plurality of driving circuits 17, a plurality of sensing electrodes 19 and a plurality of color filter layers 21. The active pixel matrix 15 disposed on the first substrate 11 includes a plurality of elements such as scan lines SL, data lines DL and pixels P. The second substrate 13 parallel to the first substrate 11 has a first surface 13a and a second surface 13b, wherein the first surface 13a faces the active pixel matrix 15 disposed on the first substrate 11.

The driving circuits 17 are distributed on the first surface 13a of the second substrate 13, and the sensing electrodes 19 are distributed on the second surface 13b, wherein the design of the shape of the sensing electrodes 19 is based on the driving circuits 17 perpendicular to the sensing electrodes 19. The structure formed by the sensing electrodes 19, the second substrate 13 and the driving circuits 17 is a touch panel structure. The driving circuits 17 and the sensing electrodes 19 are used for detecting the position of at least one touch point. The distribution of the driving circuits 17 on the first surface 13a is based on the disposition of the pixels P. In the present embodiment of the invention, the driving circuits 17 correspond to the edges of the pixels P for forming a plurality of openings 17a, the color filter layers 21 are disposed in the openings 17a, and the driving circuits 17 are directly used as a black matrix of the color filter layers 21.

The touch-sensitive display panel 1 further includes a liquid crystal layer 23 and two polarizers 25 and 27. The liquid crystal layer 23 is interposed between the first substrate 11 and the second substrate 13. The polarizers 25 and 27 are respectively disposed on the outmost surface of the first substrate 11 and that of the second substrate 13. The driving circuits 17 and the sensing electrodes 19 are used for touch sensing, directly disposed on two opposite surfaces of the second substrate 13, and, at the same time, form a structure of display panel 1 together with the first substrate 11 and the liquid crystal layer 23. The present embodiment of the invention forms the structure of the driving circuits 17 and the sensing electrodes 19 without using extra substrate, hence effectively reducing the thickness of the display panel 1. Moreover, the driving circuits 17 are directly used as a black matrix, further simplifying the complexity in the design of the traces on the structure.

Figure 2A:
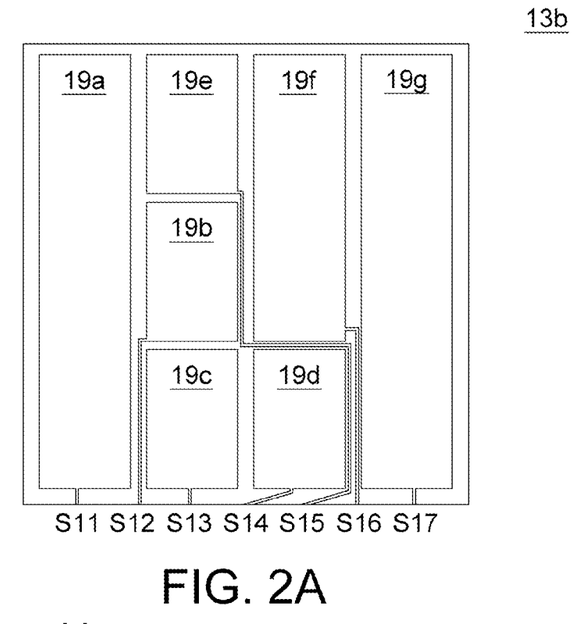
FIG. 2A shows a first layout of the sensing electrodes of FIG. 1A on the second surface of the second substrate.
Figure 2B:
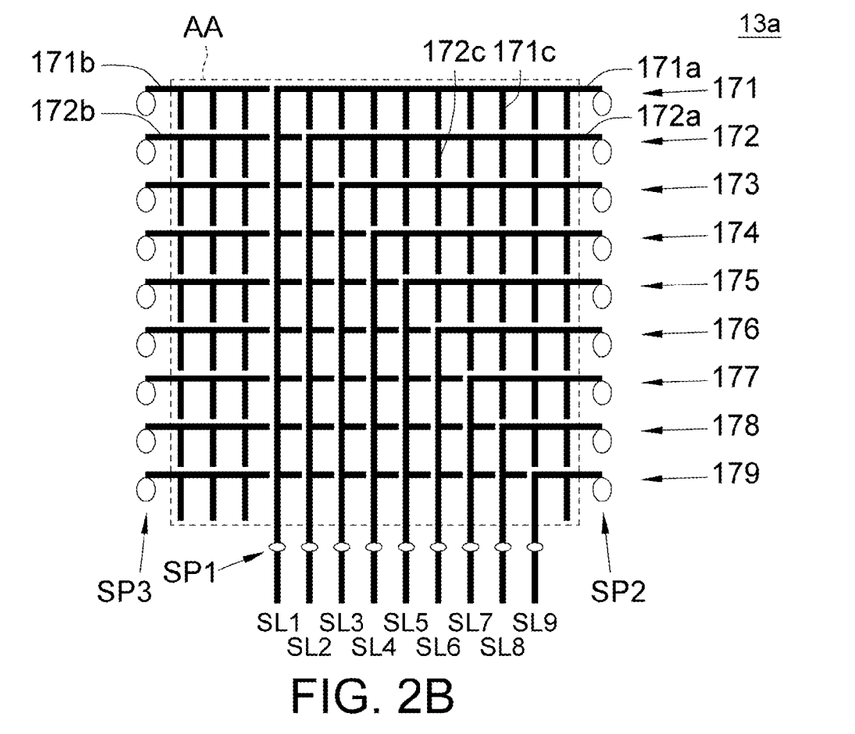
FIG. 2B shows a first layout of the sensing electrodes of FIG. 1A on the first surface of the second substrate.

Referring to FIGS. 2A and 2B. FIG. 2A shows a first layout of the sensing electrodes of FIG. 1A on the second surface of the second substrate. FIG. 2B shows a first layout of the driving circuits of FIG. 1A on the first surface of the second substrate. The driving circuits 17 corresponding to the edges of each of the pixels P (illustrated in FIG. 1B) are distributed over the first surface 13a of the second substrate 13. To simplify the drawings and disclosure, as indicated in FIG. 2B, the present embodiment is exemplified by the driving circuits 171~179 which are mutually independent and are not interconnected. Each of the driving circuits 171~179 includes a first main line, a second main line and a plurality of branch lines. Let the driving circuits 171 and 172 be taken for example. The driving circuits 171 includes a first main line 171a, a second main line 171b and a plurality of branch lines 171c, wherein the extension direction of the second main line 171b is consistent to that of a part of the first main line 171a, the branch lines 171c connecting the first main line 171a and the second main line 171b are perpendicular to the two main lines. The driving circuits 172 includes a first main line 172a, a second main line 172b and a plurality of branch lines 172c, wherein the extension direction of the second main line 172b is consistent to that of a part of the first main line 172a, and the branch lines 172c connecting the first main line 172a and the second main line 172b are perpendicular to the two main lines. The composition of the rest driving circuits, namely, the driving circuits 173~179 is implemented in the same manner. Consequently, the edges of all pixels are configured with the traces of the driving circuits, and, at the same time, are used as a black matrix of the color filter layers 21 (illustrated in FIG. 1A).

Each of the first main lines 171a, 172a and so on is an L line, and each of the second main lines 171b, 172b and so on is a straight line, wherein one end of each of the second main lines 171b, 172b and so on respectively corresponds to the bending of each of the first main lines 171a, 172a and so on. However, on the first surface 13a, the first main lines 171a, 172a and so on are not connected to the second main lines 171b, 172b and so on. Preferably, the L lines are separated at an equal distance, two adjacent L lines are interspaced by a single pixel, and the straight lines parallel to each other are also interspaced by a single pixel. One end of each of the first main lines 171a, 172a and so on is connected to the active pixel matrix 15 (illustrated in FIG. 1B), and is connected to the second main lines 171b, 172b and so on through the scan lines of the active pixel matrix 15. The other end of each of the first main lines 171a, 172a and so on inputs a signal through the scan lines of the first substrate 11, so that the first main line and the second main line receive the same signal.

When the touch-sensitive display panel 1 has a width and a length that are not consistent and a comprehensive touch sensing is needed, the design of the driving circuits 17 which combines the L-shaped first main lines and the straight-line second main lines provides a comprehensive touch sensing function. The connection of the circuits of the driving circuits 17 and the connection between the driving circuits 17 and the active pixel matrix 15 can be implemented by other elements, and a detailed description thereof is given below.

As indicated in FIG. 2B, the touch-sensitive display panel 1 further includes a plurality of conductive spacers which are divided into three groups and are located at the edges of the visible region AA. For example, one end of the first main lines 171a, 172a and so on is respectively configured with a first conductive spacer SP1. The first conductive spacers SP1 is located between the first substrate 11 and the second substrate 13 (illustrated in FIG. 1A), and is connected to the scan lines (such as the scan lines SL1~SL9) outside the visible region AA, so that each of the first main lines 171a, 172a and so on can receive a scan signal respectively. Besides, the other end of the first main lines 171a, 172a and so on is configured with a second conductive spacer SP2, and one end of each the second main lines 171b, 172b and so on is configured with a third conductive spacer SP3, wherein the second conductive spacers SP2 and the third conductive spacer SP3 are also interposed between the first substrate 11 and the second substrate 13.

Figure 2C:
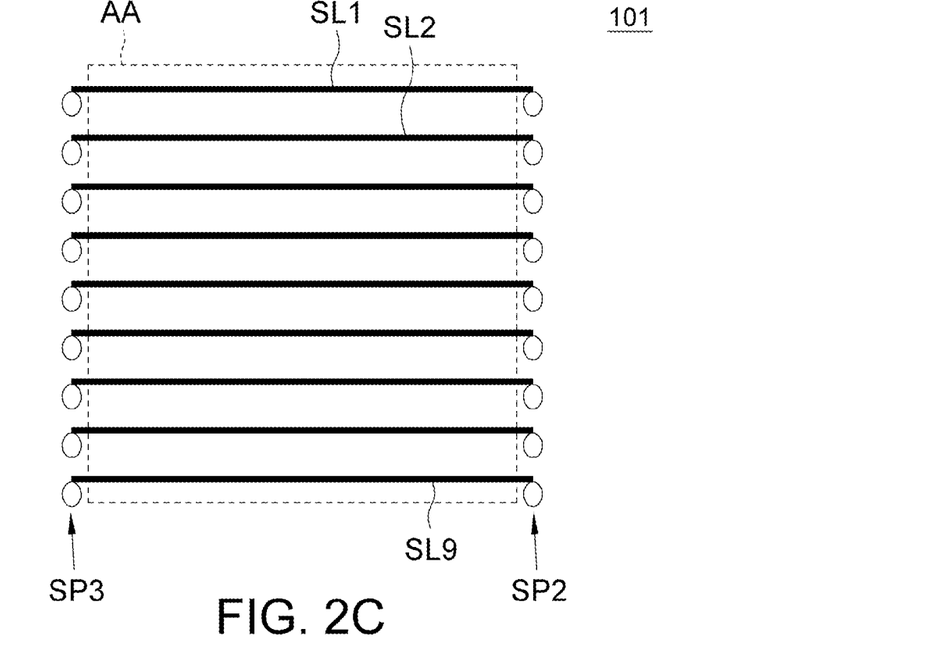
FIG. 2C shows the second and the third conductive spacer of FIG. 2B being connected on the first substrate.

Referring to FIG. 2C, the second and the third conductive spacers of FIG. 2B are connected on the first substrate. As indicated in FIG. 2C, the scan lines SL1~SL9 of the first substrate 11 within the visible region AA are used for connecting the second conductive spacer SP2 and the third conductive spacer SP3. Let the scan lines SL1 and SL2 be taken for example. The first main line 171a is connected to the second main line 171b through the second conductive spacer SP2, the scan line SL1 and the third conductive spacer SP3. The first main line 172a is connected to the second main line 172b through the second conductive spacer SP2, the scan line SL2 and the third conductive spacer SP3. The connection of other driving circuits 173~179 can be implemented in the same manner.

Since the driving circuits 171~179 are respectively connected to the scan lines SL1~SL9, whenever the driving IC (not illustrated) transmits a scan signal through the scan lines SL1~SL9 for sequentially enabling the pixels P of each row, the driving circuits 171~179 also sequentially receive the scan signal. Therefore, the scan signal can be used as a driving signal for detecting the touch point and at the same time can be combined with the sensing electrodes 19 (illustrated in FIG. 1A) for detecting the position of the touch point. According to the trace design of the L lines and the straight lines of the driving circuits 171~179, the electrode pattern of the sensing electrodes 19 can have many different designs. Preferably, the sensing electrodes 19 are a block electrode formed by a transparent conductive material.

To match with the sequence in which the scan signal is received by the driving circuits 171~179 and the traces thereof, as indicated in FIG. 2A, the composition of the sensing electrodes is exemplified by the sensing electrodes 19a~19g. The sensing electrodes 19a~19g are distributed over the entire second surface 13b and are mutually independent and not interconnected, are respectively connected to the edges of the second substrate 13 through the wire leads S11~S17. The wire leads S11~S17 can be formed by the same transparent conductive material or metal. Preferably, the leads are formed by metal which has lower resistance, so that the width of the wire leads S11~S17 can be further reduced. Despite the shape of the sensing electrodes 19a~19g being a block may look similar, the areas of the blocks do not have to be the same. The sensing electrodes 19a correspond to the second main lines and the branch lines of the driving circuits 171~179, the sensing electrodes 19b, 19c, 19e correspond to the first main lines and the branch lines of driving circuits 171~173, the sensing electrodes 19d correspond to the first main lines and the branch circuits of driving circuits 174~176, the sensing electrodes 19f correspond to the first main lines and the branch lines of driving circuits 171~176, and the sensing electrodes 19g correspond to the first main lines and the branch lines of the driving circuits 171~179.

As indicated in FIG. 2B, when the scan lines SL1~SL3 are sequentially driven, the driving circuits 171~173 are also sequentially driven at the same time. Meanwhile, the sensing electrodes 19c, 19b, 19e, 19f, 19g, 19a corresponding to the driving circuits 171~173 perform sensing function at the same time. That is, the conducting leads S13, S12, S15, S16, S17, S11 receive a signal at the same time.

When the scan lines SL4~SL6 are sequentially driven, the driving circuits 174~176 are also sequentially driven at the same time. Meanwhile, the sensing electrodes 19d, 19f, 19g, 19a corresponding to the driving circuits 174~176 also perform sensing function at the same time. That is, the conducting leads S14, S16, S17, S11 receive a signal at the same time.

When the scan lines SL7~SL9 are sequentially driven, the driving circuits 177~179 are also sequentially driven at the same time. Meanwhile, the sensing electrodes 19g, 19a corresponding to the driving circuits 177~179 perform sensing function at the same time. That is, the conducting lead S17, S11 receive a signal at the same time.

Figure 3:
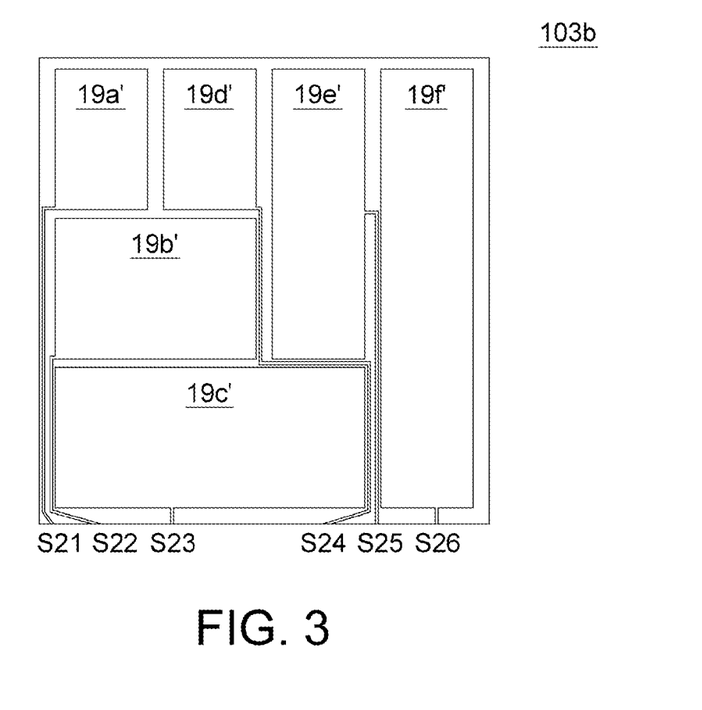
FIG. 3 shows another schematic diagram of the sensing electrodes of FIG. 2A.

Thus, through the trace design of the driving circuits 171~179 and the pattern design of the sensing electrodes 19a~19g, the touch sensing of the visible region AA is also completed at the same time after the scan lines SL1~SL9 are sequentially driven. However, the pattern of the sensing electrodes can also have other designs. Referring to FIG. 3, another schematic diagram of the sensing electrodes of FIG. 2A is shown. As indicated in FIG. 3, the sensing electrodes 19a'~19f' are distributed over the entire second surface 13b and are mutually independent and not interconnected, and are respectively connected to the edges of the second substrate 13 through the conducting leads S21~S26.

Let FIG. 2B be taken for example. When the scan lines SL1~SL3 are sequentially driven, the driving circuits 171~173 are also sequentially driven at the same time. Meanwhile, the sensing electrodes 19c', 19b', 19d', 19e', 19f', 19a' corresponding to the driving circuits 171~173 perform sensing function at the same time. That is, the conducting leads S23, S22, S24, S25, S26, S21 receive a signal at the same time.

When the scan lines SL4~SL6 are sequentially driven, the driving circuits 174~176 are also sequentially driven at the same time. Meanwhile, the sensing electrodes 19c', 19e', 19f', 19b' corresponding to the driving circuits 174~176 perform sensing function at the same time. That is, the conducting leads S23, S25, S26, S22 receive a signal at the same time.

When the scan lines SL7~SL9 are sequentially driven, the driving circuits 177~179 are also sequentially driven at the same time. Meanwhile, the sensing electrodes 19f' and 19c' corresponding to the driving circuits 177~179 perform sensing function at the same time. That is, the conducting leads S26 and S23 receive a signal at the same time. Afterwards, the touch sensing of the visible region AA is also completed at the same time.

Figure 4A:
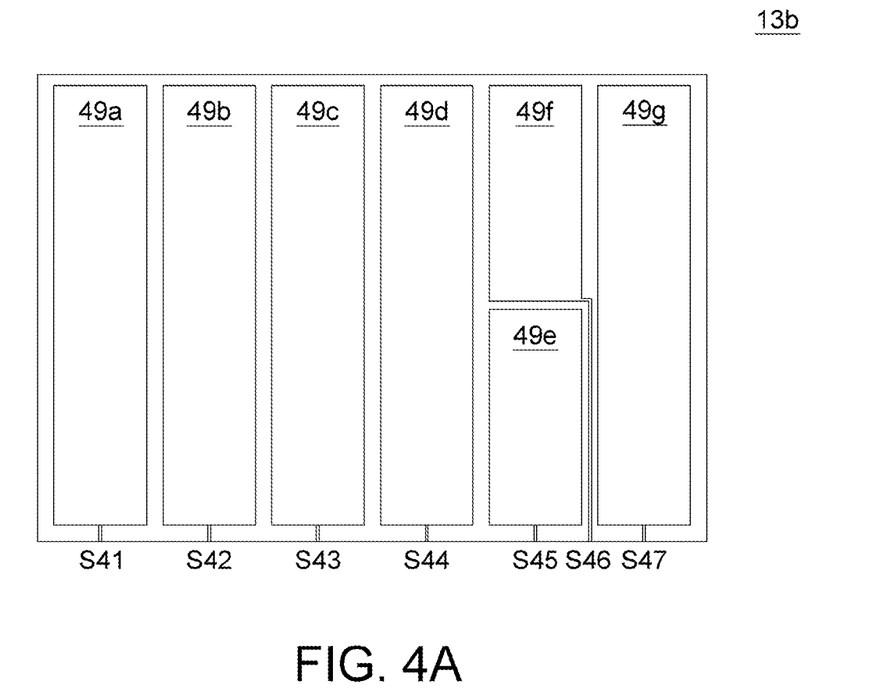
FIG. 4A shows a second layout of the sensing electrodes of FIG. 1A on the second surface of the second substrate.
Figure 4B:
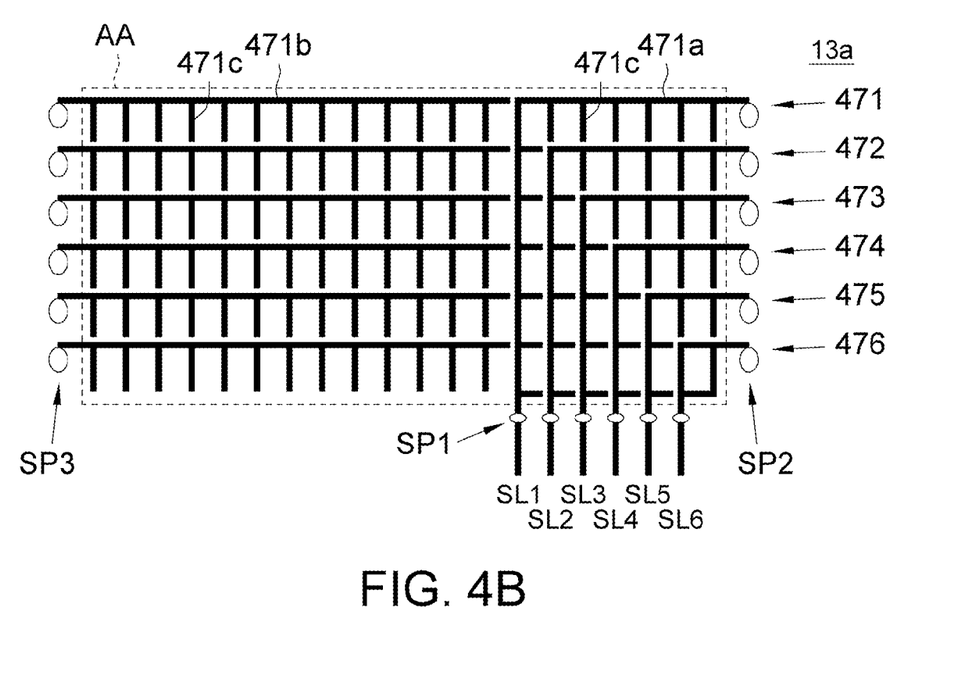
FIG. 4B shows a second layout of the sensing electrodes of FIG. 1A on the first surface of the second substrate.

Referring to FIGS. 4A and 4B. FIG. 4A shows a second layout of the sensing electrodes of FIG. 1A on the second surface of the second substrate. FIG. 4B shows a second layout of the driving circuits of FIG. 1A on the first surface of the second substrate. The driving circuits 471~476 are respectively connected to the scan lines SL1~SL6 for receiving a scan signal of the scan lines. Each of the driving circuits 471~476 has an L-type first main line and a straight-line second main line, and is connected to a plurality of branch lines on the main lines. In comparison to the second main lines of FIG. 2B, the second main lines of the driving circuits 471~476 have a larger area. Let the driving circuits 471 be taken for example. One end of the first main line 471a is connected to the scan line SL1 through the first conductive spacer SP1, and the other end is connected to the scan line SL1 (illustrated in FIG. 2C) on the first substrate 101 through the second conductive spacer SP2, then connected to the third conductive spacer SP3 through the conducting wire 31, and finally connected to one end of the second main line 471b. The other end of the second main line 471b corresponds to a bending of the first main line 471a. Besides, a plurality of branch lines 471c connect the first main line 471a and the second main line 471b and are perpendicular thereto. The traces of the remaining driving circuits 472~476 are disposed in the same manner, so that the edges of all pixels are configured with the traces of the driving circuits.

In response to the disposition of the traces of the driving circuits 471~476 of FIG. 4B, as indicated in FIG. 4A, the sensing electrodes 49a~49d correspond to the second main lines and the branch lines of driving circuits 471~476, the sensing electrodes 49e, 49f correspond to the first main lines and the branch lines of driving circuits 471~473, the sensing electrodes 49g correspond to the first main lines and the branch lines of driving circuits 471~476. The sensing electrodes 49a~49g are respectively connected to the edges of the second substrate 13 through the conducting lead S41~547.

When the scan lines SL1~SL3 are sequentially driven, the driving circuits 471~473 are also sequentially driven at the same time. Meanwhile, the sensing electrodes 49a~49g perform sensing function at the same time. That is, the conducting lead S41~S47 receive a signal at the same time. When the scan lines SL4~SL6 are sequentially driven, the driving circuits 474~476 are also sequentially driven at the same time. Meanwhile, the sensing electrodes 49g, and 49a~49d perform sensing function at the same time. That is, the conducting lead S41~S44 and S47 receive a signal at the same time. Thus, the touch sensing of the entire visible region AA is completed.

Figure 5:
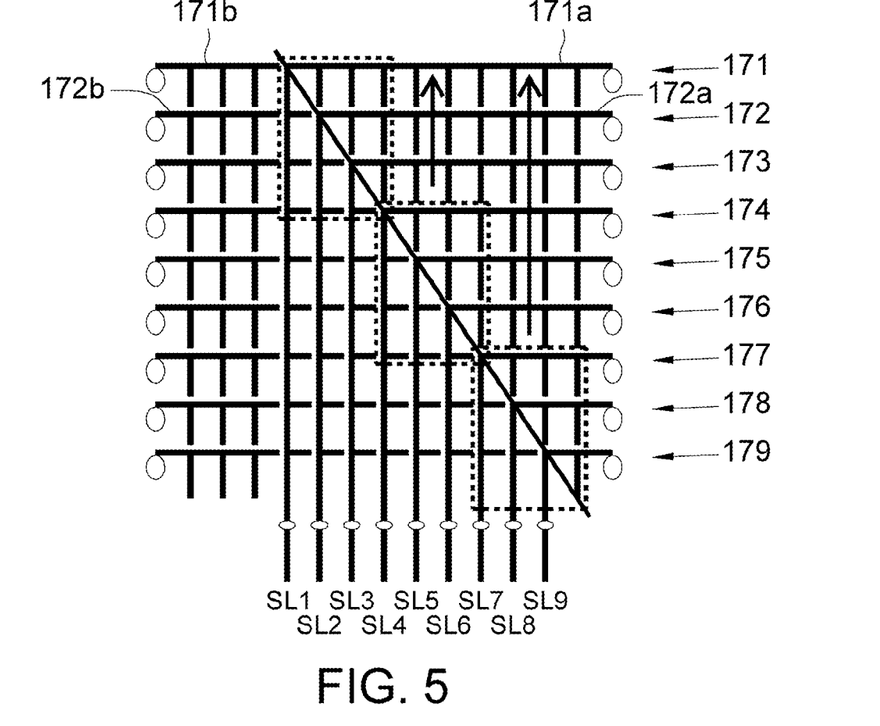
FIG. 5 shows the design and rules of the pattern of the sensing electrodes.

Referring to FIG. 5, the design and rules of the pattern of the sensing electrodes are shown. The design of the electrode pattern of the sensing electrodes is determined according to the disposition of the traces of the driving circuits 171~179 of FIG. 2B. As indicated in FIG. 5, in the region of the L lines (such as the first main lines 171a and 172a), a unit is defined by n×n pixels (here, a unit is defined by 3×3 pixels), which are arranged on a diagonal direction of the L lines from right to left and are further extended upwards. Thus, the positions of three sensing electrodes, namely, the sensing electrodes 19e, 19f, 19g (illustrated in FIG. 2A) can be determined. As for the sensing electrodes corresponding to the straight lines (such as the second main lines 171b and 172b), a unit is directly defined by a plurality of straight lines so as to define the range of the sensing electrodes such as the sensing electrode 19a of FIG. 2A, the sensing electrodes 19a', 19b', 19c' of FIG. 3 and the sensing electrodes 49a~49d of FIG. 4A.

Figure 6A:
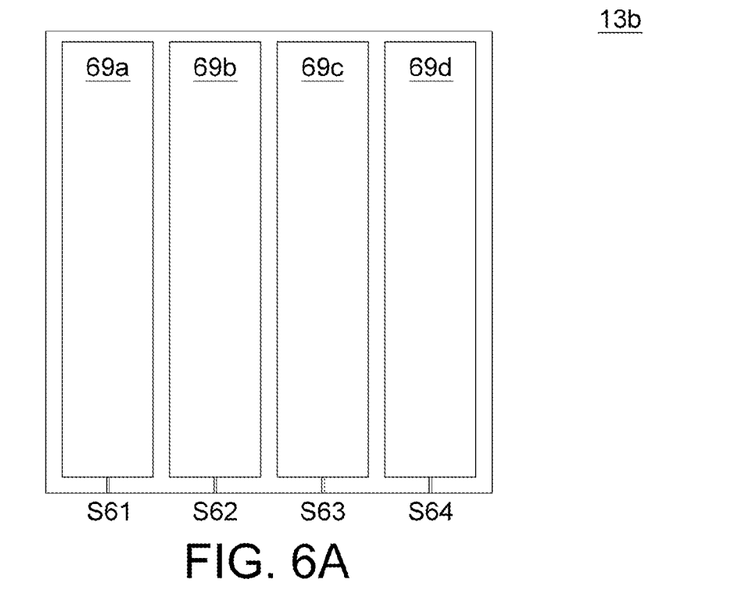
FIG. 6A shows a third layout of the sensing electrodes of FIG. 1A on the second surface of the second substrate.
Figure 6B:
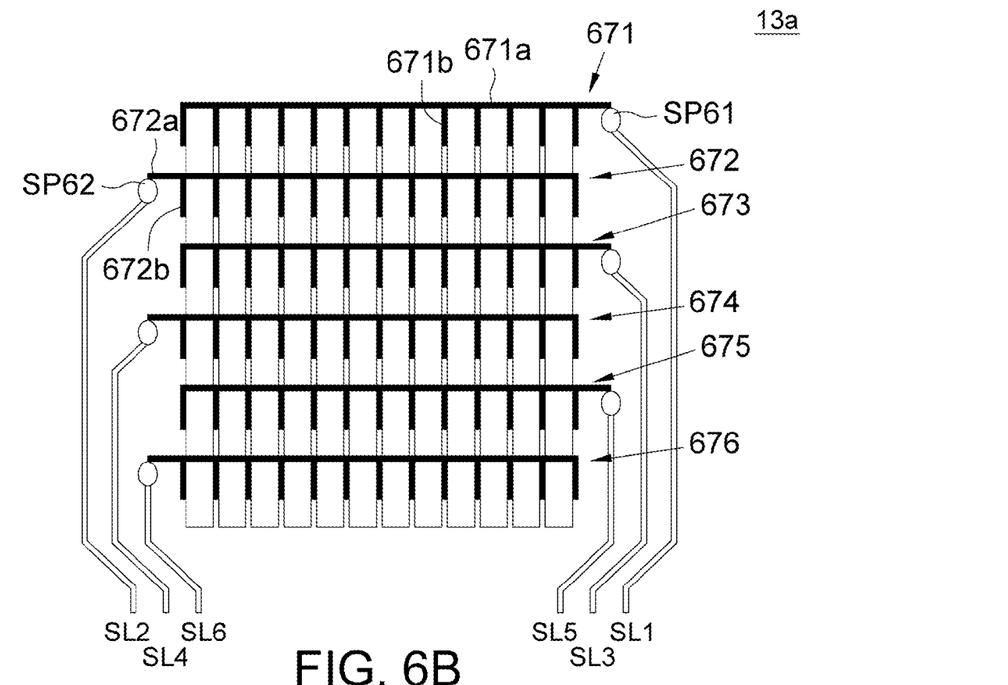
FIG. 6B shows a third layout of the sensing electrodes of FIG. 1A on the first surface of the second substrate.

Referring to FIGS. 6A and 6B. FIG. 6A shows a third layout of the sensing electrodes of FIG. 1A on the second surface of the second substrate. FIG. 6B shows a third layout of the sensing electrodes of FIG. 1A on the first surface of the second substrate. As indicated in FIG. 6B, the driving circuits 671~676 are distributed over the entire first surface 13a, and each of the driving circuits 671~676 has a main line and a plurality of branch lines. Let the driving circuit 671 be taken for example. The driving circuit 671 has a main line 671a and a plurality of branch lines 671b, wherein the branch lines 671b are mutually parallel, connect and are perpendicular to the main line 671a for forming the driving circuit 671 with a railing structure, and the main line 671a is connected to the scan line SL1 through the conductive spacer SP61. The driving circuit 672 has a main line 672a and a plurality of branch lines 672b, wherein the branch lines 672b are mutually parallel, connect and are perpendicular to the main line 672a, and the main line 672a is connected to the scan line SL2 through the conductive spacer SP62. The disposition of the traces of the remaining driving circuits 673~676 can be implemented in the same manner. The disposition of the driving circuits with a railing structure can be combined with the L-type and the straight-line driving circuits of FIGS. 2B and 4B.

As indicated in FIG. 6A, each of the sensing electrodes 69a~69d can be a strip block electrode, and, at the same time, crosses several rows of pixels and corresponds to the driving circuits 671~676. Thus, when the scan lines SL1~SL6 are sequentially driven, the driving circuits 671~676 are also sequentially driven at the same time. The sensing electrodes 69a~69d corresponding to the driving circuits 671~676 perform sensing function at the same time. That is, the conducting leads S61~S64 receive a signal at the same time.

Figure 7:
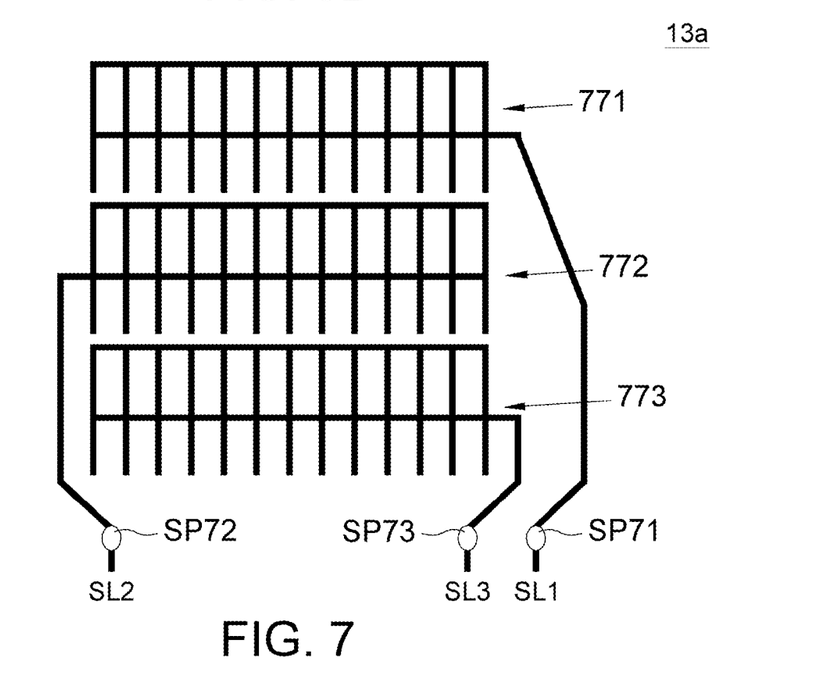
FIG. 7 shows another schematic diagram of the driving circuits of FIG. 6B.

The above conductive spacers SP61 and SP62 are disposed on two opposite edges of the disposition region of the driving circuits 671~676, so that the edges of display panel would become even wider. Referring to FIG. 7, another schematic diagram of the driving circuits of FIG. 6B is shown. The traces disposed at the edges of the first surface 13a of the driving circuits 771~773 are extended to a single edge of the visible region (not illustrated) in the same direction, and then are connected to the scan lines SL1~SL3 through conductive spacer SP71~SP73. Such arrangement will not occupy extra space of the substrate and is capable of reduce the width in the edges of the display panel. Furthermore, each of the driving circuits 771~773 can respectively correspond to several rows of pixels, such as a railing structure formed by the edges of two rows of pixels, so that the number of the scan lines connected to the driving circuits is decreased, and the complexity in structure is reduced.

Let FIG. 1A be taken for example. Since the sensing electrodes 19 and the driving circuits 17 are respectively disposed on the top side and the bottom side of the second substrate 13, the sensing electrodes 19 and the driving circuits 17 are separated at a fixed distance, and so are the sensing electrodes 19 and the active pixel matrix 15 (illustrated in FIG. 1B) separated. When the active pixel matrix 15 is driven for displaying an image, only one scan line scans one row of pixels P at each time. That is, only one driving circuit, such as one of the driving circuits 171~179 of FIG. 2B, is driven. For the voltage which drives the pixels for displaying an image, only one of the driving circuits is 15V, and the remaining driving circuits in the network formed by the driving circuits are −10V. Thus, a shielding effect is generated between the sensing electrodes 19 and the active pixel matrix 15, and noise interference will not occur between touch sensing and image displaying.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch-sensitive display panel, comprising:
    a first substrate;
    an active pixel matrix disposed on the first substrate and comprising a plurality of pixels;
    a second substrate parallel to the first substrate and comprising a first surface and a second surface, wherein the first surface faces the active pixel matrix;
    a plurality of driving circuits disposed on the first surface and corresponding to the edges of the pixels for forming a plurality of openings, and each of the driving circuits comprises:
        a first main line having a first end connected to the active pixel matrix and a second end connected to the first substrate; and
        a second main line connected to the second end of the first main line through the first substrate, wherein the extension direction of the second main line is consistent to that of a part of the first main line;
    wherein each of the first main lines is an L line, and each of the second main lines is a straight line, wherein the L lines are separated at an equal distance, and every two adjacent L lines are interspaced by a single pixel;
    a plurality of color filter layers disposed on the first surface and filled in the openings; and
    a plurality of sensing electrodes disposed on the second surface, wherein the driving circuits and the sensing electrodes are used for detecting the position of at least one touch point.

2. The touch-sensitive display panel according to claim 1, wherein the pixels are disposed within a visible region of the touch-sensitive display panel, the active pixel matrix further comprises a plurality of scan lines corresponding to the visible region and extended outside the visible region, and the first ends of the first main lines are connected to the scan lines outside the visible region for receiving a scan signal of the scan lines.

3. The touch-sensitive display panel according to claim 2, further comprising:
    a plurality of first conductive spacers disposed on the first ends;
    a plurality of second conductive spacers disposed on the second ends; and
    a plurality of third conductive spacers connected to the second main lines.

4. The touch-sensitive display panel according to claim 3, wherein the second conductive spacers and the third conductive spacers are connected through the scan lines within the visible region.

5. The touch-sensitive display panel according to claim 3, wherein:
    the first conductive spacers are located at a first edge of the visible region,
    the second conductive spacers are located at a second edge of the visible region,
    the third conductive spacers are located at a third edge of the visible region, wherein the second edge is perpendicular to the first edge, and the third edge is parallel to the second edge.

6. The touch-sensitive display panel according to claim 1, wherein a unit defined by n×n pixels is arranged on a diagonal direction of the L lines, a part of the sensing electrodes corresponds to at least n×n pixels on the diagonal direction.

7. The touch-sensitive display panel according to claim 1, wherein each of the driving circuits further comprises a plurality of branch lines being connected to the first main lines and the second main lines and perpendicular to the first main lines and the second main lines.

8. The touch-sensitive display panel according to claim 1, wherein each of the sensing electrodes is a block electrode, and at least a part of the block electrodes has the same area.

9. The touch-sensitive display panel according to claim 8, wherein the block electrodes with the same area are corresponding to the second main lines.

10. The touch-sensitive display panel according to claim, wherein an edge of each of the sensing electrodes has a conducting lead formed by a transparent conductive material or a metal.

11. A touch-sensitive display panel, comprising:
a first substrate;
an active pixel matrix disposed on the first substrate and comprising a plurality of pixels;
a second substrate parallel to the first substrate and comprising a first surface and a second surface, wherein the first surface faces the active pixel matrix;
a plurality of driving circuits disposed on the first surface and corresponding to the edges of the pixels for forming a plurality of openings, and each of the driving circuits comprises:
a first main line having a first end connected to the active pixel matrix and a second end connected to the first substrate; and
a second main line connected to the second end of the first main line through the first substrate, wherein the extension direction of the second main line is consistent to that of a part of the first main line;
wherein each of the first main lines is an L line, and each of the second main lines is a straight line, wherein a unit defined by n×n pixels is arranged on a diagonal direction of the L lines, a part of the sensing electrodes corresponds to at least n×n pixels on the diagonal direction;
a plurality of color filter layers disposed on the first surface and filled in the openings; and
a plurality of sensing electrodes disposed on the second surface, wherein the driving circuits and the sensing electrodes are used for detecting the position of at least one touch point.

12. The touch-sensitive display panel according to claim 11, wherein the pixels are disposed within a visible region of the touch-sensitive display panel, the active pixel matrix further comprises a plurality of scan lines corresponding to the visible region and extended outside the visible region, and the first ends of the first main lines are connected to the scan lines outside the visible region for receiving a scan signal of the scan lines.

13. The touch-sensitive display panel according to claim 12, further comprising:
a plurality of first conductive spacers disposed on the first ends;
a plurality of second conductive spacers disposed on the second ends; and
a plurality of third conductive spacers connected to the second main lines.

14. The touch-sensitive display panel according to claim 13, wherein the second conductive spacers and the third conductive spacers are connected through the scan lines within the visible region.

15. The touch-sensitive display panel according to claim 13, wherein:
the first conductive spacers are located at a first edge of the visible region,
the second conductive spacers are located at a second edge of the visible region,
the third conductive spacers are located at a third edge of the visible region, wherein the second edge is perpendicular to the first edge, and the third edge is parallel to the second edge.

16. The touch-sensitive display panel according to claim 11, wherein the L lines are separated at an equal distance, and every two adjacent L lines are interspaced by a single pixel.

17. The touch-sensitive display panel according to claim 11, wherein each of the driving circuits further comprises a plurality of branch lines being connected to the first main lines and the second main lines and perpendicular to the first main lines and the second main lines.

18. The touch-sensitive display panel according to claim 11, wherein each of the sensing electrodes is a block electrode, and at least a part of the block electrodes has the same area.

19. The touch-sensitive display panel according to claim 18, wherein the block electrodes with the same area are corresponding to the second main lines.

20. The touch-sensitive display panel according to claim 11, wherein an edge of each of the sensing electrodes has a conducting lead formed by a transparent conductive material or a metal.

* * * * *